(12) United States Patent
Kaku

(10) Patent No.: US 12,437,480 B2
(45) Date of Patent: Oct. 7, 2025

(54) TERMINAL APPARATUS, MEDIUM, AND METHOD OF OPERATING TERMINAL APPARATUS

(71) Applicant: TOYOTA JIDOSHA KABUSHIKI KAISHA, Toyota (JP)

(72) Inventor: Wataru Kaku, Musashino (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 235 days.

(21) Appl. No.: 18/067,304

(22) Filed: Dec. 16, 2022

(65) Prior Publication Data

US 2023/0196680 A1 Jun. 22, 2023

(30) Foreign Application Priority Data

Dec. 21, 2021 (JP) ................................. 2021-207464

(51) Int. Cl.
*G10L 15/26* (2006.01)
*G06T 19/00* (2011.01)
*H04N 7/15* (2006.01)

(52) U.S. Cl.
CPC .............. *G06T 19/00* (2013.01); *G10L 15/26* (2013.01); *H04N 7/157* (2013.01)

(58) Field of Classification Search
CPC ................................. H04N 7/157; G10L 15/26
See application file for complete search history.

(56) References Cited

U.S. PATENT DOCUMENTS

| | | | |
|---|---|---|---|
| 10,574,623 B2 * | 2/2020 | Geppert | H04L 12/1822 |
| 2007/0291108 A1 * | 12/2007 | Huber | H04N 7/15 348/E7.083 |
| 2009/0210804 A1 | 8/2009 | Kurata et al. | |
| 2015/0113439 A1 * | 4/2015 | Kimura | G06Q 50/01 715/752 |
| 2020/0059561 A1 * | 2/2020 | Murali | H04M 3/568 |

FOREIGN PATENT DOCUMENTS

| | | |
|---|---|---|
| JP | 2005-250859 A | 9/2005 |
| JP | 2006-246239 A | 9/2006 |
| JP | 6849133 B1 | 3/2021 |
| WO | 2009/104564 A1 | 8/2009 |

\* cited by examiner

*Primary Examiner* — Matthew Salvucci
(74) *Attorney, Agent, or Firm* — Sughrue Mion, PLLC

(57) ABSTRACT

A terminal apparatus includes a communication interface, an output interface, and a controller configured to communicate with terminal apparatuses of a plurality of called parties via the communication interface and output, via the output interface, an image of a virtual space, the image including images of the plurality of called parties, and speech of the plurality of called parties. The controller outputs images or speech of called parties in a plurality of groups to which a caller belongs in a different form than other called parties and outputs information, to terminal apparatuses of the called parties in the plurality of groups, for outputting an image or speech of the caller in a different form than terminal apparatuses of other called parties.

9 Claims, 9 Drawing Sheets

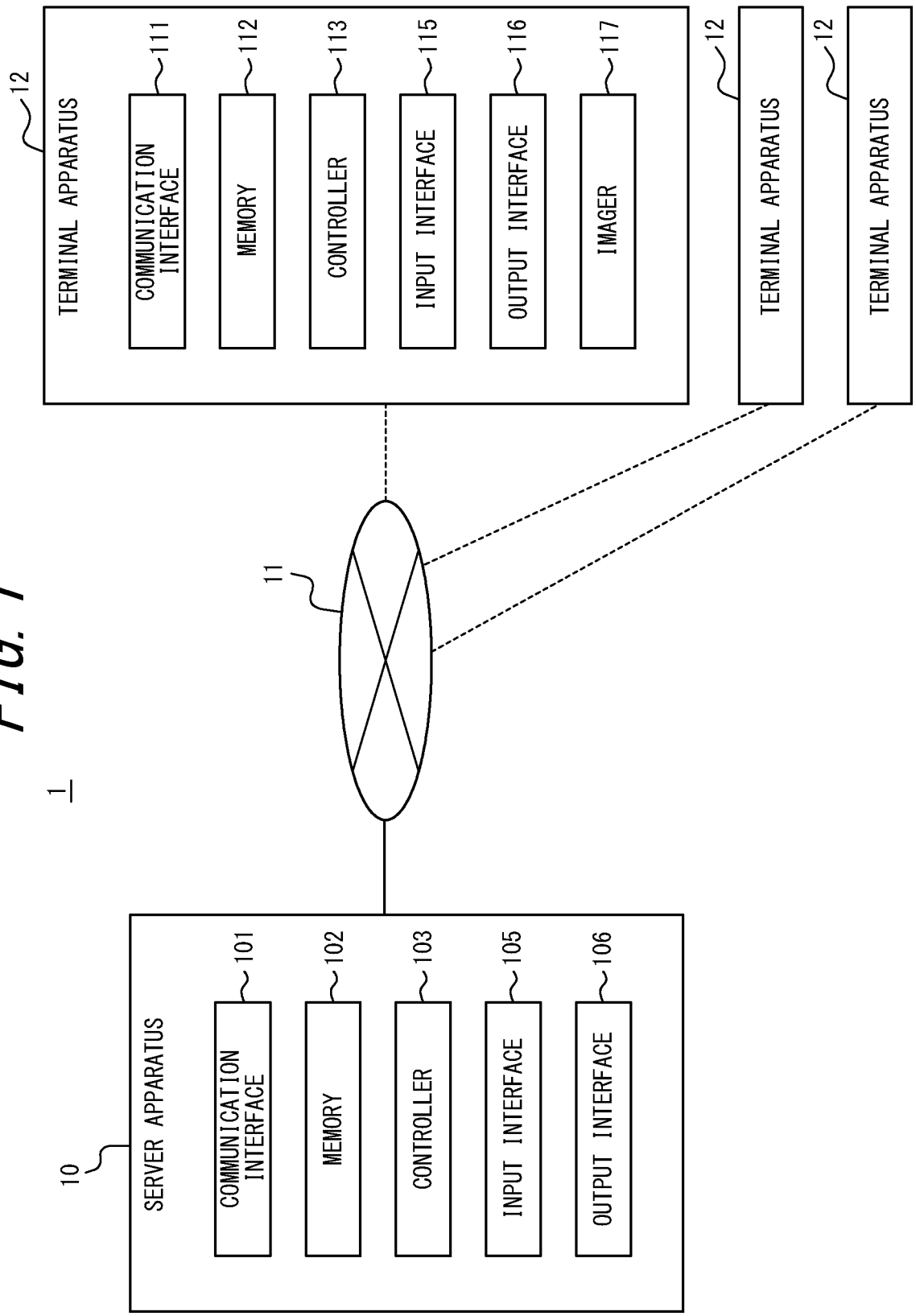

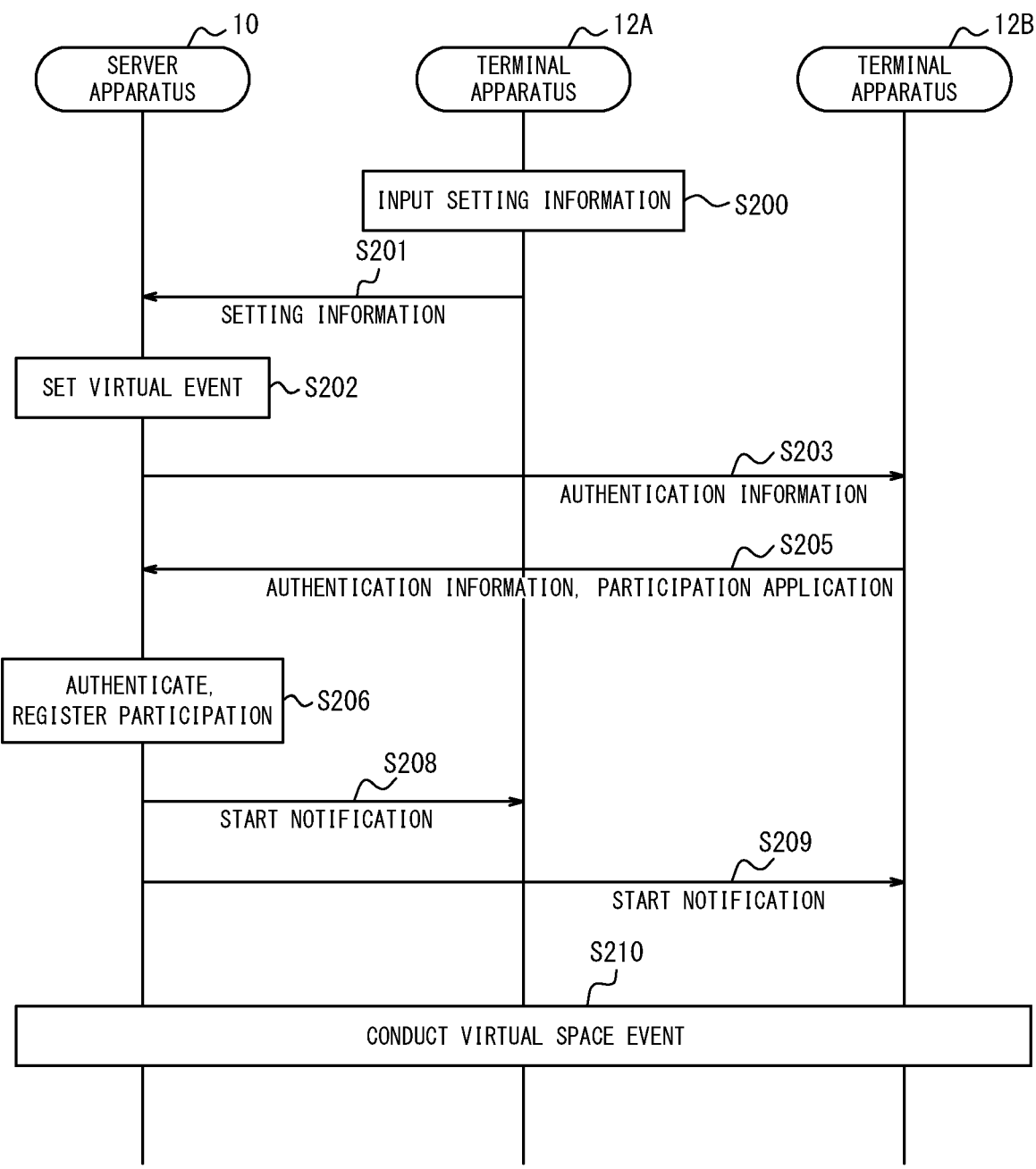

TERMINAL APPARATUS, MEDIUM, AND METHOD OF OPERATING TERMINAL APPARATUS

CROSS-REFERENCE TO RELATED APPLICATION

This application claims priority to Japanese Patent Application No. 2021-207464, filed on Dec. 21, 2021, the entire contents of which are incorporated herein by reference.

TECHNICAL FIELD

The present disclosure relates to a terminal apparatus, a medium, and a method of operating a terminal apparatus.

BACKGROUND

A method is known for computers at multiple points to communicate via a network for a plurality of users to make calls to each other in a virtual space on the network. Various forms of technology have been proposed to improve the convenience for users when they make calls in this way on the network. For example, Patent Literature (PTL) 1 discloses a technique for adjusting call volume parameters according to the distance from other users in the virtual space in a call system that enables a plurality of users to communicate with one another while viewing one another's images.

CITATION LIST

Patent Literature

PTL 1: JP 6849133 B2

SUMMARY

There is room for further improvement in user convenience during a call in a virtual space.

It would be helpful to provide a terminal apparatus and the like that contribute to user convenience during a call in a virtual space.

A terminal apparatus according to the present disclosure includes:
 a communication interface;
 an output interface; and
 a controller configured to communicate with terminal apparatuses of a plurality of called parties via the communication interface and output, via the output interface, an image of a virtual space, the image including images of the plurality of called parties, and speech of the plurality of called parties, wherein
 the controller outputs images or speech of called parties in a plurality of groups to which a caller belongs in a different form than other called parties and outputs information to terminal apparatuses of the called parties in the plurality of groups for outputting an image or speech of the caller in a different form than terminal apparatuses of other called parties.

A terminal apparatus program stored by a medium according to the present disclosure is a program to be executed by a controller of a terminal apparatus including a communication interface, an output interface, and the controller, the program being configured to cause the controller to:
 communicate with terminal apparatuses of a plurality of called parties via the communication interface and output, via the output interface, an image of a virtual space, the image including images of the plurality of called parties, and speech of the plurality of called parties, wherein
 the program is further configured to cause the controller to output images or speech of called parties in a plurality of groups to which a caller belongs in a different form than other called parties and output information to terminal apparatuses of the called parties in the plurality of groups for outputting an image or speech of the caller in a different form than terminal apparatuses of other called parties.

A method of operating a terminal apparatus according to the present disclosure is a method of operating a terminal apparatus including a communication interface, an output interface, and a controller, the method including:
 communicating, by the controller, with terminal apparatuses of a plurality of called parties via the communication interface and outputting, via the output interface, an image of a virtual space, the image including images of the plurality of called parties, and speech of the plurality of called parties; and
 outputting, by the controller, images or speech of called parties in a plurality of groups to which a caller belongs in a different form than other called parties and outputting information to terminal apparatuses of the called parties in the plurality of groups for outputting an image or speech of the caller in a different form than terminal apparatuses of other called parties.

The terminal apparatus and the like according to the present disclosure can contribute to the convenience for users who make calls in a virtual space.

BRIEF DESCRIPTION OF THE DRAWINGS

In the accompanying drawings:
FIG. 1 is a diagram illustrating an example configuration of a virtual event provision system;
FIG. 2 is a sequence diagram illustrating an example of operations of the virtual event provision system.

DETAILED DESCRIPTION

Figure 3A:
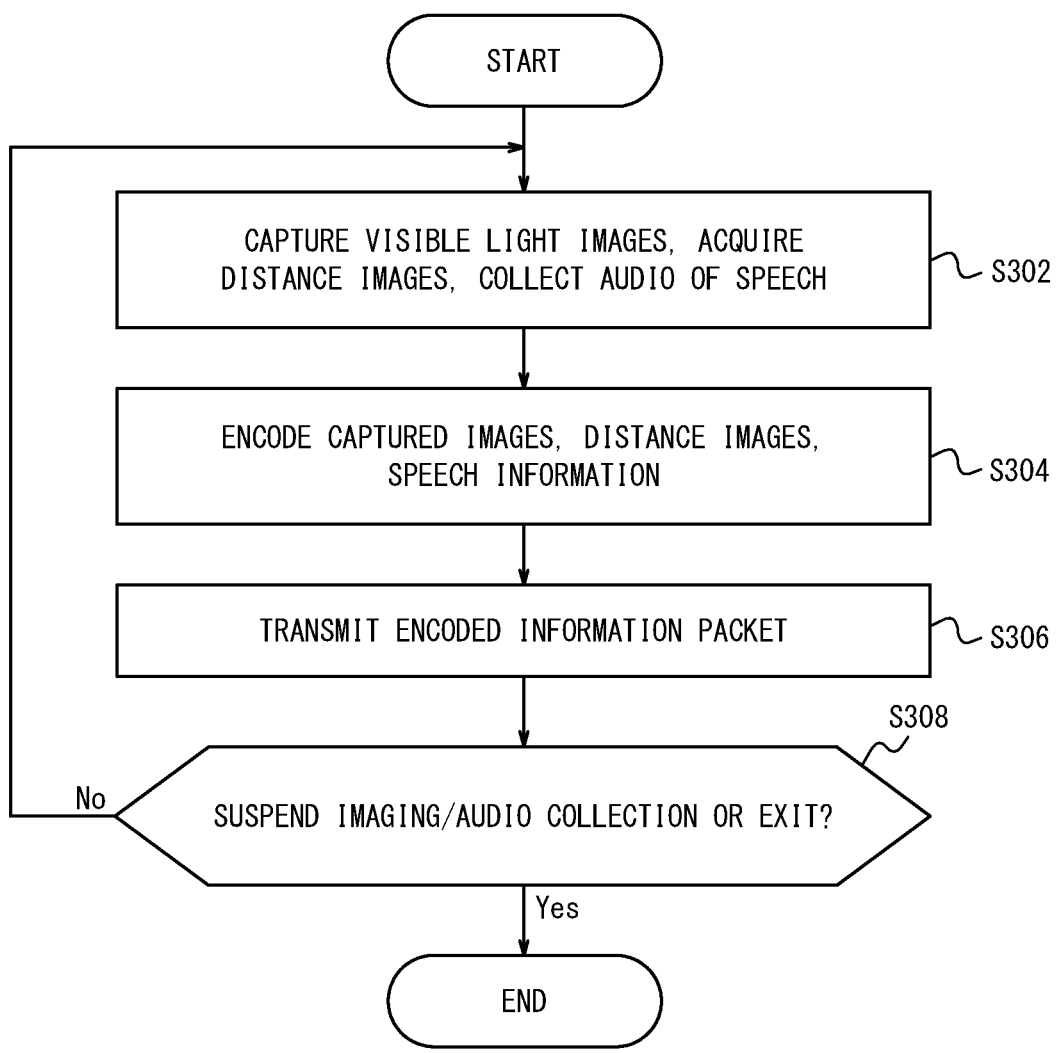
FIG. 3A is a flowchart illustrating an example of operations of a terminal apparatus.

Embodiments are described below.

FIG. 1 is a diagram illustrating an example configuration of a virtual event provision system 1 in an embodiment. The virtual event provision system 1 includes a plurality of terminal apparatuses 12 and a server apparatus 10 that are communicably connected to each other via a network 11. The virtual event provision system 1 is a system for providing events in a virtual space, i.e., virtual events, in which users can participate using the terminal apparatuses 12. A virtual event is an event in which a plurality of users can hold a call with each other, by speech or the like, in a virtual space. Each user is represented by an image such as a 3D model. The event in the present embodiment is a discussion on any topic, a party for free conversation among users, or the like.

The server apparatus 10 is, for example, a server computer that belongs to a cloud computing system or other computing system and functions as a server that implements various functions. The server apparatus 10 may be configured by two or more server computers that are communicably connected to each other and operate in cooperation. The server apparatus 10 transmits and receives, and performs information processing on, information necessary to provide virtual events.

Each terminal apparatus 12 is an information processing apparatus provided with communication functions and is used by a user who participates in a virtual event provided by the server apparatus 10. The terminal apparatus 12 is, for example, an information processing terminal, such as a smartphone or a tablet terminal, or an information processing apparatus, such as a personal computer.

The network 11 may, for example, be the Internet or may include an ad hoc network, a Local Area Network (LAN), a Metropolitan Area Network (MAN), other networks, or any combination thereof.

When a call among users of terminal apparatuses 12 is described below from the perspective of one of the terminal apparatuses 12, the user of that terminal apparatus 12 is referred to as the caller, and the users of the other terminal apparatuses 12 as the called parties.

In the present embodiment, the terminal apparatus 12 includes a communication interface 111, an output interface 116, and a controller 113. The controller 113 communicates with terminal apparatuses 12 of a plurality of called parties via the communication interface 111 and outputs, via the output interface 116, an image of a virtual space, the image including images of the plurality of called parties, and speech of the plurality of called parties. The controller 113 outputs images or speech of called parties in a plurality of groups to which a caller belongs in a different form than other called parties and outputs information, to terminal apparatuses 12 of the called parties in the plurality of groups, for outputting an image or speech of the caller in a different form than terminal apparatuses 12 of other called parties. With the terminal apparatus 12, a caller can select a desired called party from among a plurality of called parties to form a group, or can join a group of desired called parties, and can hold a call with the called parties in the group without being heard by other called parties outside the group. Such calls are hereinafter referred to as group calls. In the present embodiment, the caller can hold a group call after joining a plurality of groups, which improves convenience for users who make calls in the virtual space.

Respective configurations of the server apparatus 10 and the terminal apparatuses 12 are described in detail.

The server apparatus 10 includes a communication interface 101, a memory 102, a controller 103, an input interface 105, and an output interface 106. These configurations are appropriately arranged on two or more computers in a case in which the server apparatus 10 is configured by two or more server computers.

The communication interface 101 includes one or more interfaces for communication. The interface for communication is, for example, a LAN interface. The communication interface 101 receives information to be used for the operations of the server apparatus 10 and transmits information obtained by the operations of the server apparatus 10. The server apparatus 10 is connected to the network 11 by the communication interface 101 and communicates information with the terminal apparatuses 12 via the network 11.

The memory 102 includes, for example, one or more semiconductor memories, one or more magnetic memories, one or more optical memories, or a combination of at least two of these types, to function as main memory, auxiliary memory, or cache memory. The semiconductor memory is, for example, Random Access Memory (RAM) or Read Only Memory (ROM). The RAM is, for example, Static RAM (SRAM) or Dynamic RAM (DRAM). The ROM is, for example, Electrically Erasable Programmable ROM (EEPROM). The memory 102 stores information to be used for the operations of the server apparatus 10 and information obtained by the operations of the server apparatus 10.

The controller 103 includes one or more processors, one or more dedicated circuits, or a combination thereof. The processor is a general purpose processor, such as a central processing unit (CPU), or a dedicated processor, such as a graphics processing unit (GPU), specialized for a particular process. The dedicated circuit is, for example, a field-programmable gate array (FPGA), an application specific integrated circuit (ASIC), or the like. The controller 103 executes information processing related to operations of the server apparatus 10 while controlling components of the server apparatus 10.

The input interface 105 includes one or more interfaces for input. The interface for input is, for example, a physical key, a capacitive key, a pointing device, a touch screen integrally provided with a display, or a microphone that receives audio input. The input interface 105 accepts operations to input information used for operation of the server apparatus 10 and transmits the inputted information to the controller 103.

The output interface 106 includes one or more interfaces for output. The interface for output is, for example, a display or a speaker. The display is, for example, a liquid crystal display (LCD) or an organic electro-luminescent (EL) display. The output interface 106 outputs information obtained by the operations of the server apparatus 10.

The functions of the server apparatus 10 are realized by a processor included in the controller 103 executing a control program. The control program is a program for causing a computer to function as the server apparatus 10. Some or all of the functions of the server apparatus 10 may be realized by a dedicated circuit included in the controller 103. The control program may be stored on a non-transitory recording/storage medium readable by the server apparatus 10 and be read from the medium by the server apparatus 10.

Each terminal apparatus 12 includes a communication interface 111, a memory 112, a controller 113, an input interface 115, an output interface 116, and an imager 117.

The communication interface 111 includes a communication module compliant with a wired or wireless LAN standard, a module compliant with a mobile communication standard such as LTE, 4G, or 5G, or the like. The terminal apparatus 12 connects to the network 11 via a nearby router apparatus or mobile communication base station using the communication interface 111 and communicates information with the server apparatus 10 and the like over the network 11.

The memory 112 includes, for example, one or more semiconductor memories, one or more magnetic memories, one or more optical memories, or a combination of at least two of these types. The semiconductor memory is, for example, RAM or ROM. The RAM is, for example, SRAM or DRAM. The ROM is, for example, EEPROM. The memory 112 functions as, for example, a main memory, an auxiliary memory, or a cache memory. The memory 112 stores information to be used for the operations of the controller 113 and information obtained by the operations of the controller 113.

The controller 113 has one or more general purpose processors, such as CPUs or Micro Processing Units (MPUs), or one or more dedicated processors, such as GPUs, that are dedicated to specific processing. Alternatively, the controller 113 may have one or more dedicated circuits such as FPGAs or ASICs. The controller 113 is configured to perform overall control of the operations of the terminal apparatus 12 by operating according to the control/processing programs or operating according to operation procedures implemented in the form of circuits. The controller 113 then transmits and receives various types of information to and from the server apparatus 10 and the like via the communication interface 111 and executes the operations according to the present embodiment.

The input interface 115 includes one or more interfaces for input. The interface for input is, for example, a physical key, a capacitive key, a pointing device, a touch screen integrally provided with a display, or a proximity sensor such as an infrared sensor that detects gestures by the user. The interface for input may also include a microphone that accepts audio input and a camera that captures images. The interface for input may further include a scanner, camera, or IC card reader that scans an image code. The input interface 115 accepts operations for inputting information to be used in the operations of the controller 113 and transmits the inputted information to the controller 113.

The output interface 116 includes one or more interfaces for output. The interface for output may include, for example, a display or a speaker. The display is, for example, an LCD or an organic EL display. The output interface 116 outputs information obtained by the operations of the controller 113.

The imager 117 includes a camera that captures an image of a subject using visible light and a distance measuring sensor that measures the distance to the subject to acquire a distance image. The camera captures a subject at, for example, 15 to 30 frames per second to produce a moving image formed by a series of captured images. Distance measurement sensors include ToF (Time Of Flight) cameras, LiDAR (Light Detection And Ranging), and stereo cameras and generate distance images of a subject that contain distance information. The imager 117 transmits the captured images and the distance images to the controller 113.

The functions of the controller 113 are realized by a processor included in the controller 113 executing a control program. The control program is a program for causing the processor to function as the controller 113. Some or all of the functions of the controller 113 may be realized by a dedicated circuit included in the controller 113. The control program may be stored on a non-transitory recording/storage medium readable by the terminal apparatus 12 and be read from the medium by the terminal apparatus 12.

In the present embodiment, the controller 113 acquires a captured image and a distance image of the caller with the imager 117 and collects audio of the speech of the caller with the microphone of the input interface 115. The controller 113 encodes the captured image and distance image of the caller, which are for generating a 3D model representing the caller, and speech information, which is for reproducing the caller's speech, to generate encoded information. The controller 113 may perform any appropriate processing (such as resolution change and trimming) on the captured images and the like at the time of encoding. The controller 113 uses the communication interface 111 to transmit the encoded information to the other terminal apparatus 12 via the server apparatus 10. The controller 113 also receives encoded information, transmitted from the other terminal apparatus 12 via the server apparatus 10, using the communication interface 111. Upon decoding the encoded information received from the other terminal apparatus 12, the controller 113 uses the decoded information to generate a 3D model representing the called party who uses the other terminal apparatus 12 and places the 3D model in the virtual space. The controller 113 may further use the captured image and distance image of the caller to generate a 3D model representing the caller and place the 3D model in the virtual space. In generating the 3D model, the controller 113 generates a polygon model using the distance image and applies texture mapping to the polygon model using the captured image, thereby generating the 3D model. This example is not limiting, however, and any appropriate method can be used to generate the 3D model. When the controller 113 generates virtual space images for output by rendering, the virtual space image including a 3D model from a predetermined viewpoint in the virtual space, the output interface 116 displays the virtual space images and outputs speech of the called party based on the speech information for the called party. These operations of the controller 113 and the like enable the caller of the terminal apparatus 12 to participate in the virtual event and talk with the called party in real time.

FIG. 2 is a sequence diagram illustrating the operating procedures of the virtual event provision system 1. This sequence diagram illustrates the procedures for coordinated operation of the server apparatus 10 and the plurality of terminal apparatuses 12 (referred to as the terminal apparatuses 12A and 12B for convenience). These procedures are, for example, the operating procedures performed when the caller using the terminal apparatus 12A acts as an administrator/participant in a virtual event and invites the called party using the terminal apparatus 12B to the virtual event. In a case of inviting a plurality of called parties, the operating procedures for the terminal apparatus 12B illustrated here are performed by each terminal apparatus 12B of a plurality of called parties, or by each terminal apparatus 12B and the server apparatus 10.

The steps pertaining to the various information processing by the server apparatus 10 and the terminal apparatuses 12 in FIG. 2 are performed by the respective controllers 103 and 113. The steps pertaining to transmitting and receiving various types of information to and from the server apparatus 10 and the terminal apparatuses 12 are performed by the respective controllers 103 and 113 transmitting and receiving information to and from each other via the respective communication interfaces 101 and 111. In the server apparatus 10 and the terminal apparatuses 12, the respective controllers 103 and 113 appropriately store the information that is transmitted and received in the respective memories 102 and 112. Furthermore, the controller 113 of the terminal apparatus 12 accepts input of various types of information with the input interface 115 and outputs various types of information with the output interface 116.

In step S200, the terminal apparatus 12A accepts input of virtual event setting information by the caller. The setting information includes the schedule of the virtual event, the topic for discussion, a list of participants, and the like. The list of participants includes each participant's name and email address. In step S201, the terminal apparatus 12A then transmits the setting information to the server apparatus 10. The server apparatus 10 receives the information transmitted from the terminal apparatus 12A. For example, the terminal apparatus 12A accesses a site provided by the server apparatus 10 for conducting a virtual event, acquires an input screen for setting information, and displays the input screen to the user. Then, once the caller inputs the setting information on the input screen, the setting information is transmitted to the server apparatus 10.

In step S202, the server apparatus 10 sets up a virtual event based on the setting information. The controller 103 stores information on the virtual event and information on the expected participants in association in the memory 102.

In step S203, the server apparatus 10 transmits authentication information to the terminal apparatus 12B. The authentication information is information used to identify and authenticate a user who uses the terminal apparatus 12B, i.e., information such as an ID and passcode used when participating in a virtual event. Such information is, for example, transmitted as an e-mail attachment. The terminal apparatus 12B receives the information transmitted from the server apparatus 10.

In step S205, the terminal apparatus 12B transmits the authentication information received from the server apparatus 10 and information on a participation application to the server apparatus 10. The called party operates the terminal apparatus 12B and applies to participate in the virtual event using the authentication information transmitted by the server apparatus 10. For example, the terminal apparatus 12B accesses the site provided by the server apparatus 10 for the virtual event, acquires the input screen for the authentication information and the information on the participation application, and displays the input screen to the called party. The terminal apparatus 12B then accepts the information inputted by the called party and transmits the information to the server apparatus 10.

In step S206, the server apparatus 10 performs authentication on the called party, thereby completing registration for participation. The identification information for the terminal apparatus 12B and the identification information for the called party are stored in association in the memory 102.

In steps S208 and S209, the server apparatus 10 transmits an event start notification to the terminal apparatuses 12A and 12B. Upon receiving the information transmitted from the server apparatus 10, the terminal apparatuses 12A and 12B begin the imaging and collection of audio of speech for the caller and the called party, respectively.

In step S210, a virtual event is conducted by the terminal apparatuses 12A and 12B via the server apparatus 10. The terminal apparatuses 12A and 12B transmit and receive information for generating 3D models representing the caller and the called party, respectively, and information on speech to each other via the server apparatus 10. The terminal apparatuses 12A and 12B output images of the virtual event, including the 3D models of the both parties, and speech of the other party to the caller and the called party, respectively.

Figure 3B:
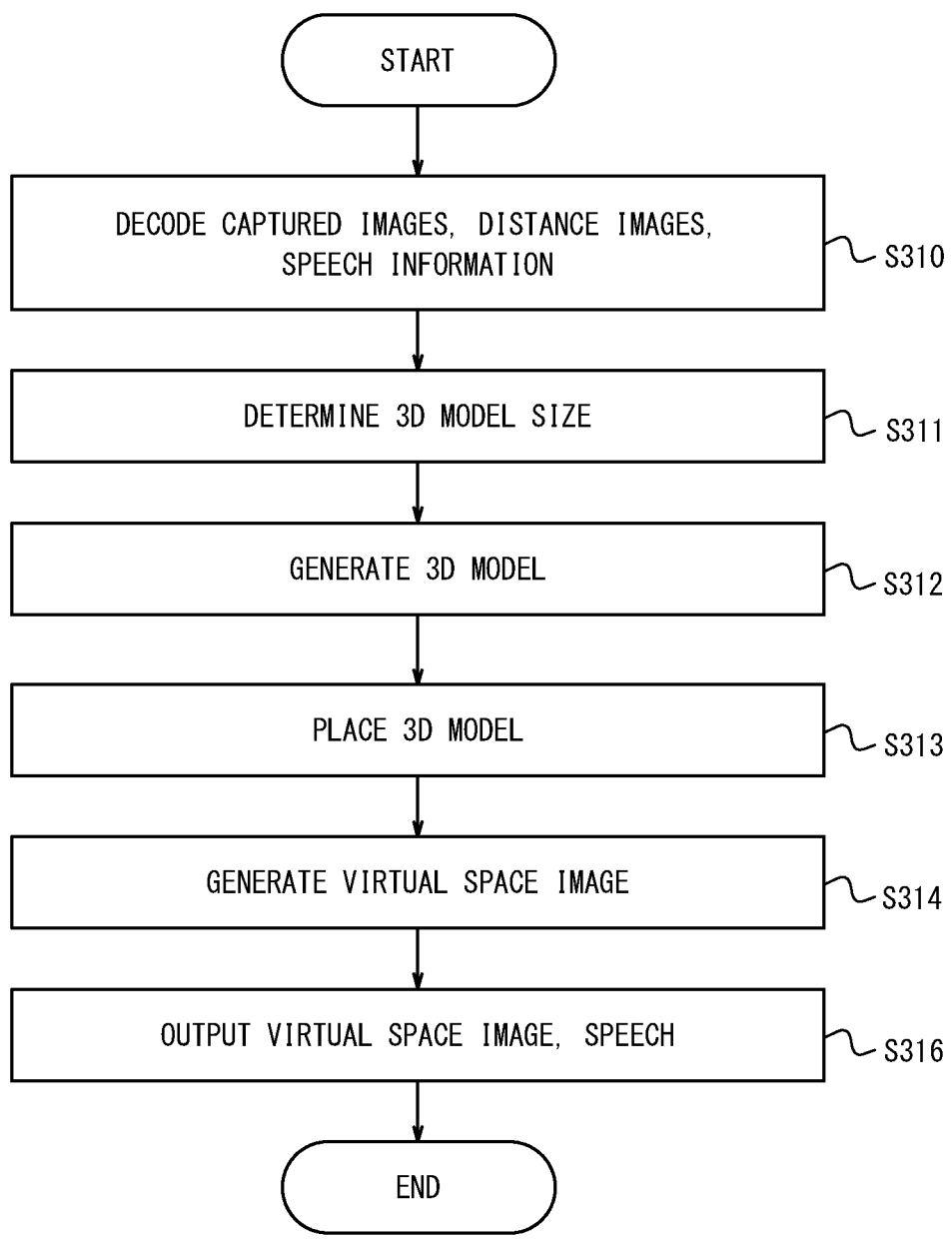
FIG. 3B is a flowchart illustrating an example of operations of a terminal apparatus.

FIGS. 3A and 3B are flowcharts illustrating the operating procedures of the terminal apparatus 12 for conducting a virtual event. The procedures illustrated here are common to the terminal apparatuses 12A and 12B and are described without distinguishing between the terminal apparatuses 12A and 12B.

FIG. 3A relates to the operating procedures of the controller 113 when the terminal apparatus 12 transmits information for generating a 3D model of the caller and information on audio of speech.

In step S302, the controller 113 captures visible light images and acquires distance images of the participant at an appropriately set frame rate using the imager 117 and collects audio of the caller's speech using the input interface 115. The controller 113 acquires the images captured by visible light and the distance images from the imager 117 and the speech information from the input interface 115.

In step S304, the controller 113 encodes the captured image, the distance image, and the speech information to generate encoded information.

In step S306, the controller 113 converts the encoded information into packets using the communication interface 111 and transmits the packets to the server apparatus 10 for the other terminal apparatus 12.

When information inputted for an operation by the caller to suspend imaging and collection of audio or to exit the virtual event is acquired (Yes in S308), the controller 113 terminates the processing procedure in FIG. 3A, whereas while not acquiring information corresponding to an operation to suspend or exit (No in S308), the controller 113 executes steps S302 to S306 and transmits, to the other terminal apparatus 12, information for generating a 3D model representing the caller and information for outputting speech.

FIG. 3B relates to the operating procedures of the controller 113 when the terminal apparatus 12 outputs an image of the virtual event, which includes the called party, and speech of the called party. Upon receiving, via the server apparatus 10, a packet transmitted by the other terminal apparatus 12 performing the procedures in FIG. 3A, the controller 113 performs steps S310 to S313. When receiving information from terminal apparatuses 12 of a plurality of called parties, the controller 113 performs steps S310 to S313 for each of the other terminal apparatuses 12. Also, upon acquiring the captured image, distance image, and speech of the caller, the controller 113 performs steps S310 to S313.

In step S310, the controller 113 decodes the encoded information included in the packet received from the other terminal apparatus to acquire the captured image, distance image, and speech information. When performing step S302, the controller 113 acquires the captured image and distance image of the caller from the imager 117 and the speech information from the input interface 115.

In step S312, the controller 113 generates a 3D model representing each participant based on the captured image and the distance image.

In step S313, the controller 113 places 3D models representing the caller and the called party in the virtual space where the virtual event is held. The memory 112 stores, in advance, information on the coordinates of the virtual space and the coordinates at which the 3D models of the caller and the called party should be placed according to the order in which they are authenticated, for example.

In step S314, the controller 113 renders and generates a virtual space image in which the plurality of 3D models placed in the virtual space are captured from a virtual viewpoint.

Figure 4:
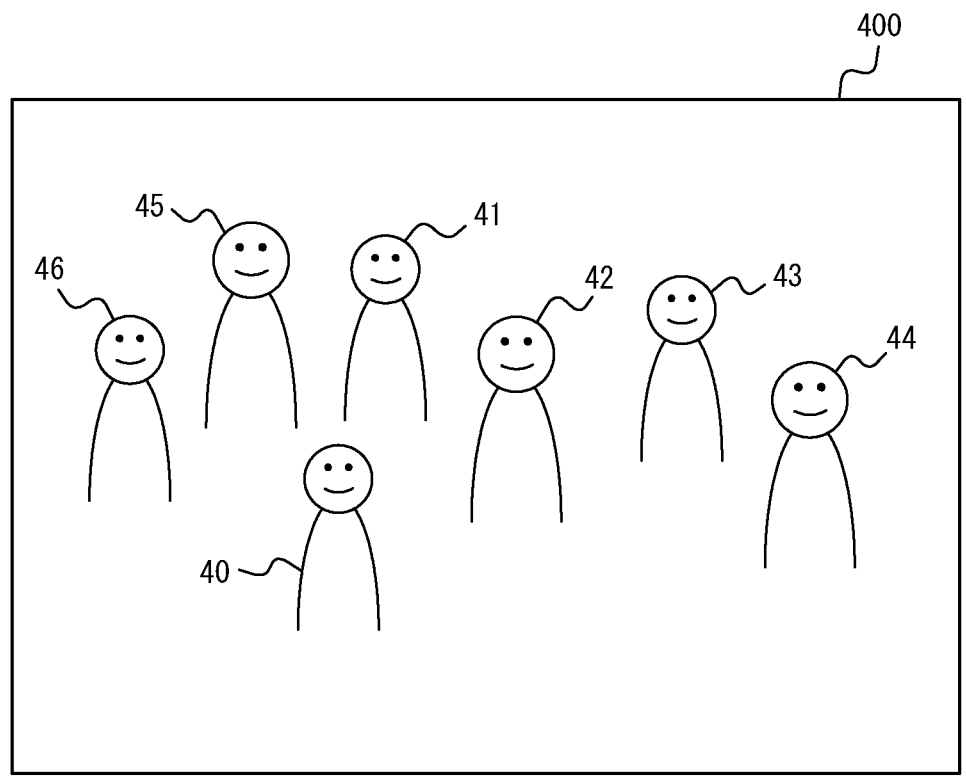
FIG. 4 is a diagram illustrating an example of a virtual space image.

In step S316, the controller 113 displays the virtual space image and outputs speech using the output interface 116. In other words, the controller 113 outputs information to the output interface 116 for displaying images of an event in which 3D models are placed in a virtual space, and the output interface 116 outputs the virtual space images and outputs speech of the caller. For example, the output interface 116 displays a virtual space image 400 that includes a caller 40 and called parties 41 to 46, represented by 3D models, as illustrated in FIG. 4.

By the controller 113 repeatedly performing steps S310 to S316, the caller can hear the speech of the called parties while watching a video of the virtual space images that include the 3D models of the called parties. The controller 113 can also move the position of the caller 40 in the virtual space image 400 in response to an operation by the caller. Examples of the operation by the caller include dragging operations, performed on the touch panel or with a pointing device; gestures; and the like. The controller 113 transmits information on movement of the 3D model, such as information on direction and amount of movement, to the other terminal apparatus 12. By doing so, the other terminal apparatus 12 can move the caller 40 in the virtual space image 400 that is displayed to the called parties. The controller 113 may also move the called parties 41 to 46 in response to information on movement transmitted by other terminal apparatuses 12.

Figure 5A:
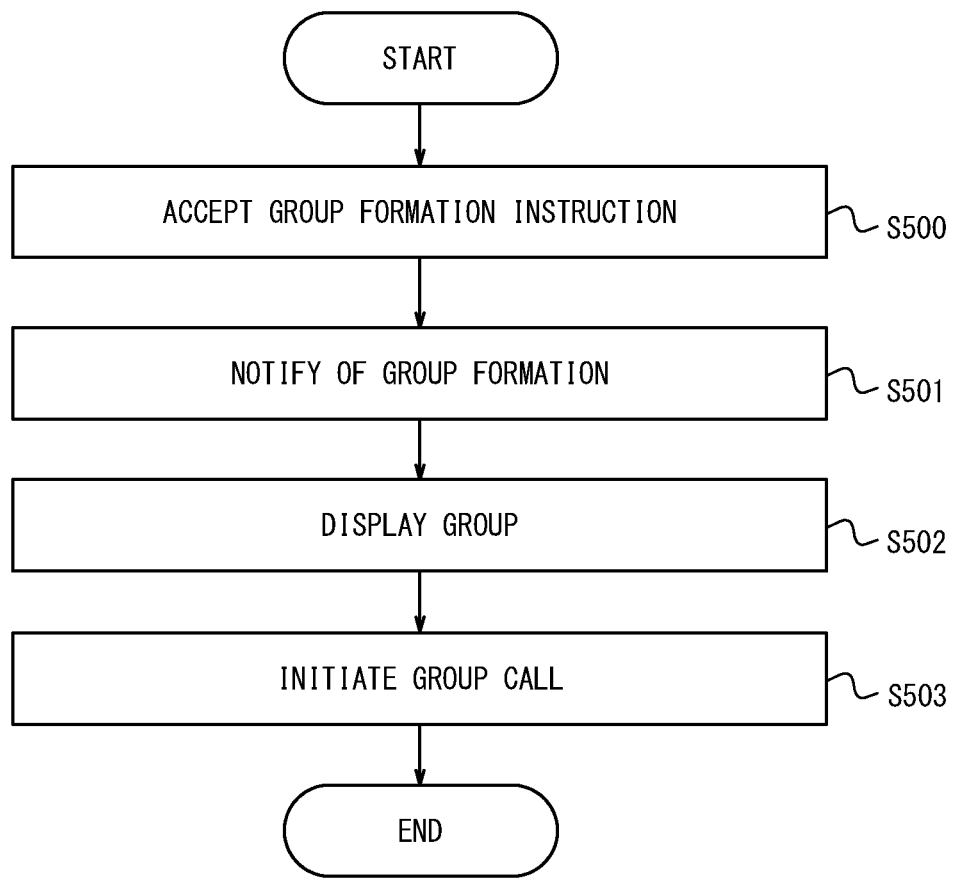
FIG. 5A is a flowchart illustrating an example of operations of a terminal apparatus.
Figure 5B:
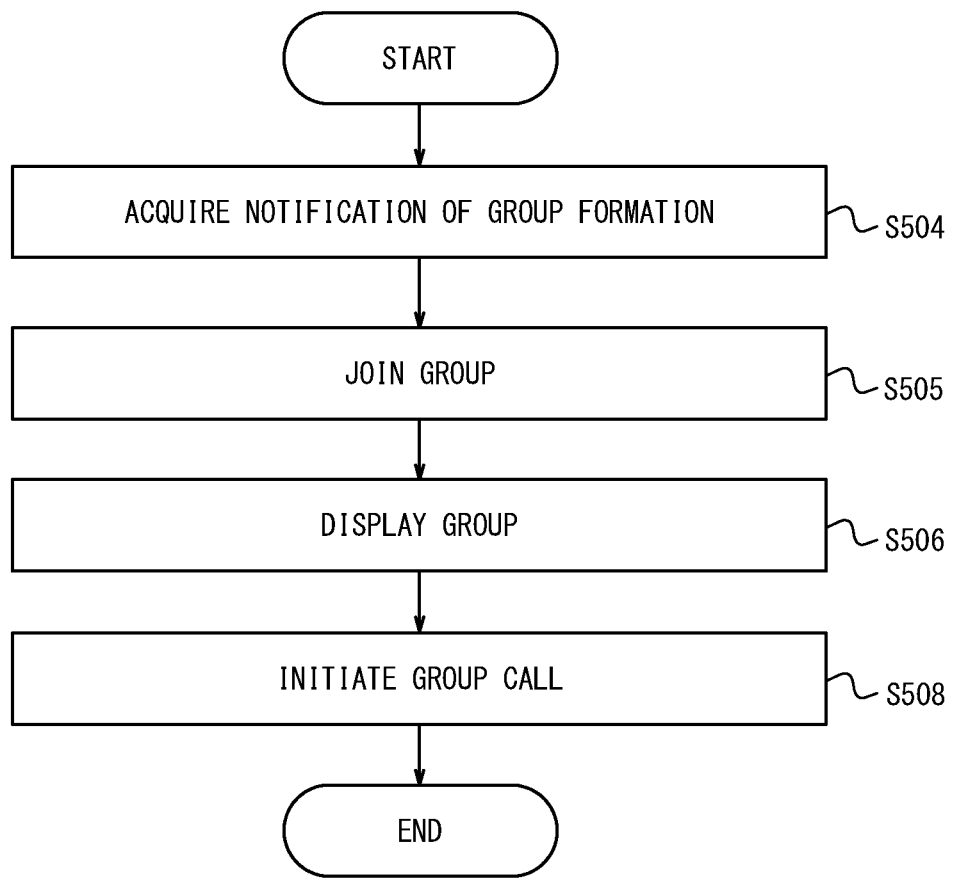
FIG. 5B is a flowchart illustrating an example of operations of a terminal apparatus.

FIGS. 5A and 5B are flowcharts illustrating the operating procedures of the terminal apparatus 12 for performing a group call in a virtual event. The procedures illustrated here are common to the terminal apparatuses 12A and 12B and are described without distinguishing between the terminal apparatuses 12A and 12B.

FIG. 5A relates to the operating procedures when the controller 113 performs a process on the terminal apparatus 12 for the caller to form a group consisting of desired called parties. The procedures in FIG. 5A are, for example, performed in response to an operation by the caller to indicate group formation.

In step S500, the controller 113 accepts a group formation instruction. The controller 113 accepts input from the input interface 115 in response to an operation by the caller. The caller indicates the formation of a group with selected called parties by, for example, selecting the desired called parties in the virtual space image by tapping or by clicking with a pointing device.

In step S501, the controller 113 provides notification of group formation. The controller 113 stores information identifying the called parties selected by the caller in association with each other and notifies the terminal apparatuses 12 of the called parties in the group, and the terminal apparatuses 12 of the other called parties outside the group, of the formation of the group. The notification contains information identifying the caller and the called parties in the group. The obtaining of consent to join the group from the terminal apparatuses 12 of the called parties in the group may be set as a condition for the controller 113 to proceed to the next step.

In step S502, the controller 113 displays the formed group. The controller 113 displays the caller and called parties in the group in a different form than the other called parties outside the group. For example, in the virtual space image 400 illustrated in FIG. 6A, the caller 40 and the called parties 41, 42 in the group are displayed in a different form than the other called parties 43 to 46 outside the group. Different display forms include the addition of effects, such as light emission or shading; thickening of outlines; an increased number of polygons; increased size; and the like. Alternatively, the controller 113 may place the caller 40 and the called parties 41 and 42 in the group in close proximity, surrounded by a border line 60. However, the form of display illustrated here is not limiting, as long as the caller 40 and the called parties 41 and 42 in the group can be distinguished from the other called parties 43 to 46.

In step S503, the controller 113 initiates a group call. The controller 113 outputs the speech of the called parties in the group in a different form than the other called parties outside the group. For example, in the example virtual space image 400 in FIG. 6A, the controller 113 outputs the speech of called parties 41 and 42 in the group at a higher volume than the speech of other called parties 43 to 46 outside the group. Alternatively, the controller 113 may mute the speech of the other called parties 43 to 46 outside the group. In that case, the controller 113 may display text corresponding to the speech of the other called parties 43 to 46 outside the group. This makes it easier for the caller to focus on the group call.

FIG. 5B relates to the operating procedures when the controller 113 performs a process on the terminal apparatus 12 for the caller to join a group formed by a called party. When step S501 in FIG. 5A is performed on another terminal apparatus and a notification of group formation is transmitted, for example, the procedures in FIG. 5B are performed by the controller 113 in response to the notification.

In step S504, the controller 113 acquires the notification of group formation. Based on the notification, the controller 113 identifies the called parties included in the group. Here, the controller 113 may output a message for the caller to confirm whether to consent to join the group and return, accept input indicating whether the caller consents, and return that information to the other terminal apparatus 12.

In step S505, the controller 113 joins the group. The controller 113 identifies the called parties in the group and stores information on the identified called parties in association with each other.

Figure 6A:
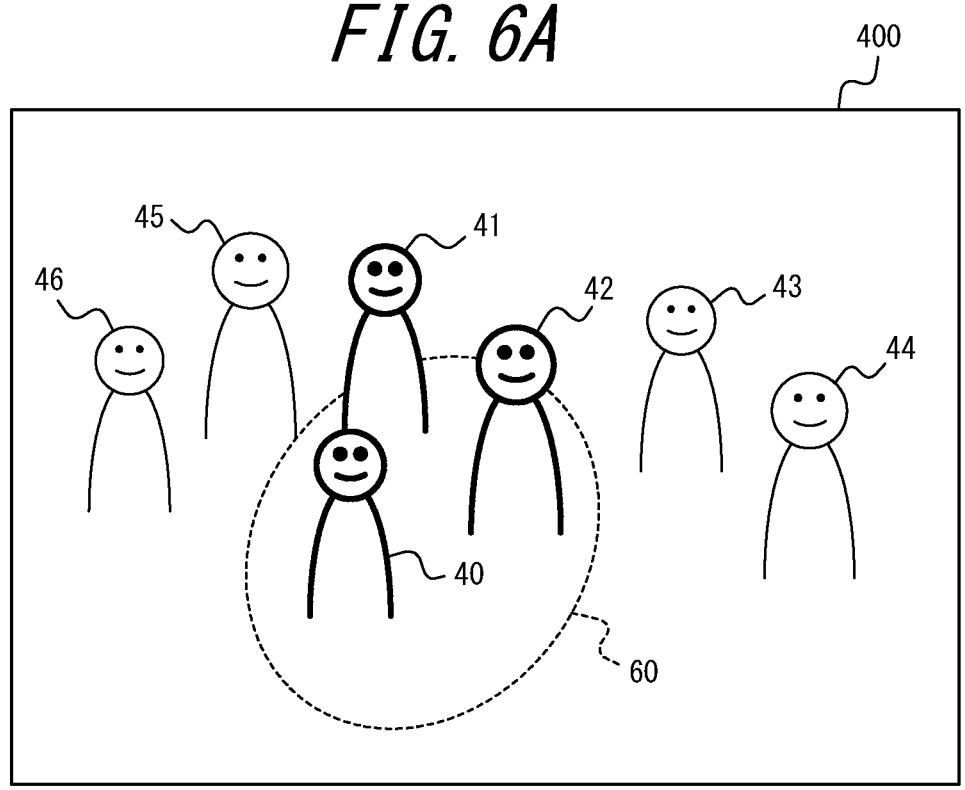
FIG. 6A is a diagram illustrating an example of a virtual space image.

In step S506, the controller 113 displays the group that has been joined. The controller 113 displays the caller and called parties in the group in a different form than the other called parties outside the group, for example as illustrated in FIG. 6A.

In step S508, the controller 113 initiates a group call. The controller 113 outputs the speech of the called parties in the group in a different form than the other called parties outside the group.

The aforementioned procedures in FIGS. 5A and 5B are performed on each terminal apparatus 12 for a plurality of terminal apparatuses 12 to perform a group call. Based on the notification from the terminal apparatus 12 of the caller who forms the group, the terminal apparatuses 12 of the called parties outside the group display the caller who forms the group in a different form than the other called parties. In this way, the called parties outside the group can recognize the formation of the group.

Figure 6B:
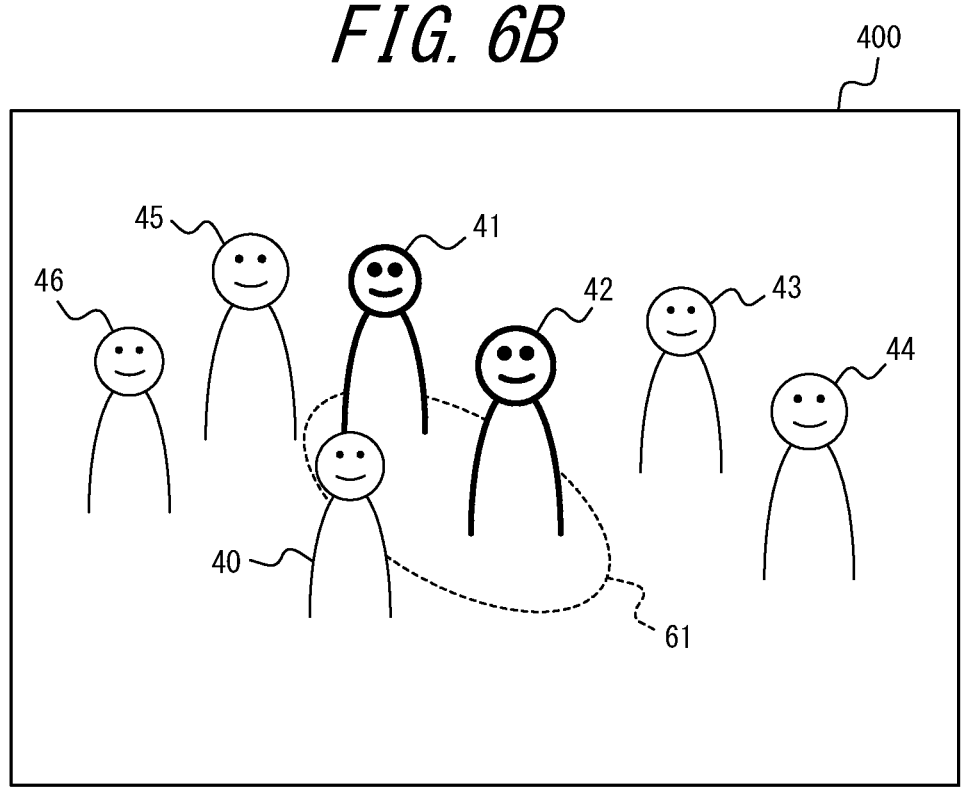
FIG. 6B is a diagram illustrating an example of a virtual space image.

The procedure in FIG. 5A is also performed in a case in which a caller selects a called party in a group that the caller has not joined. For example, the controller 113 displays a virtual space image 400 such a s the one illustrated in FIG. 6B. Here, the caller 40 has not joined a group formed by called parties 41 and 42. The called parties 41 and 42 are surrounded by a border line 61 or the like for display in a different form than the other called parties 43 to 46 to indicate that a group has been formed. The controller 113 accepts input from the caller to select the called parties 41 and 42 by, for example, a tap or gesture. Alternatively, the caller can make a selection by a tap or gesture within the border line 61. In this case, in step S501, the controller 113 stores information identifying the called parties selected by the caller in association with each other and notifies the terminal apparatuses 12 of the called parties in the group and the terminal apparatuses 12 of the other called parties outside the group of the updated group. With this configuration, the caller can join an existing group to perform a group call.

The procedure in FIG. 5A is also performed in a case in which the caller has already joined a group and selects a called party outside of the group. In this case, in step S501, the controller 113 stores information on the called parties in the group that the caller has already joined and information identifying the newly selected called party in association with each other and notifies the terminal apparatuses 12 of the called parties in the group and the terminal apparatuses 12 of the other called parties outside the group of the updated group. With this configuration, the caller can add a new called party to an existing group to perform a group call.

The procedure in FIG. 5B is performed in a case in which a caller is selected by a called party who has joined an existing group. The controller 113 stores information that identifies the called parties included in the group based on the notification of group formation. With this configuration, the caller can join an already joined group to perform a group call.

The procedure in FIG. 5B is also performed in a case in which the caller has already joined a group and is selected by a called party outside of the group. For example, the controller 113 updates and joins the group in step S505. The controller 113 identifies the called parties in the group and the new called party and stores information on the identified called parties in association with each other. With this configuration, the caller can update an already joined group and join the updated group to perform a group call.

In the present embodiment, the terminal apparatus 12 further enables group calls by the caller in a plurality of separate groups. When the procedures in FIGS. 5A and 5B have been performed by the terminal apparatus 12 and the caller is performing a group call, the caller can further perform an operation on the terminal apparatus 12 to form another group with another called party or join another group. In response, the terminal apparatus 12 performs the procedures in FIGS. 5A and 5B for the other called party or group.

Figure 7A:
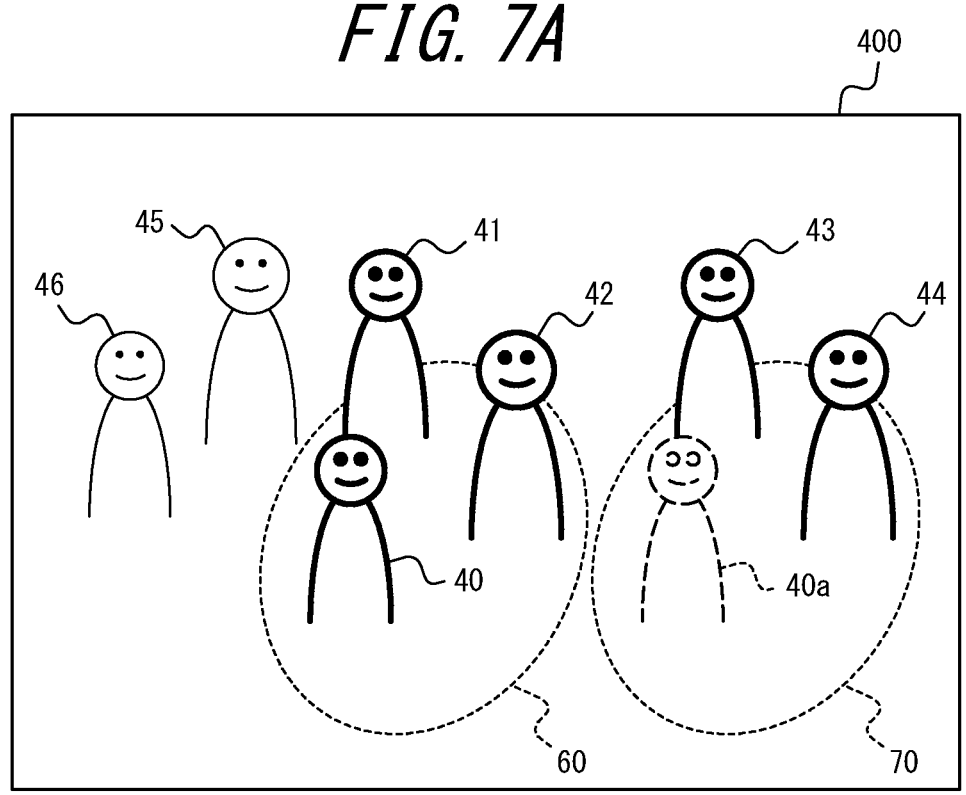
FIG. 7A is a diagram illustrating an example of a virtual space image.

FIG. 7A illustrates an example of a virtual space image 400 in a case in which a caller forms another group or joins another group while a group call is taking place. In the example illustrated here, while performing a group call with the called parties 41 and 42 in the group enclosed by the border line 60, the caller 40 forms another group with other called parties 43 and 44, or joins the group of the called parties 43 and 44. In this case, instead of updating the group that includes the called parties 41 and 42 so as to include the called parties 43 and 44, the caller performs an operation to choose to join the different groups simultaneously. For example, the caller performs an operation such as a tap or gesture to select such a feature from a pop-up menu. Once the caller selects the called parties 43 and 44, or their group, the controller 113 displays an avatar 40a of the caller, and a group with the avatar 40a and the called parties 43 and 44 is formed and displayed. Here, the group with the avatar 40a and the called parties 43 and 44 is illustrated in a different form than the called parties 45 and 46, who are not included in either group. This different form includes being surrounded by a border line 70. The avatar 40a of the caller who joins the group is displayed on the terminal apparatus 12 of each of the called parties 43 and 44 so that each called party can recognize that the caller has joined.

In the present embodiment, when a caller joins a plurality of groups simultaneously, the terminal apparatus 12 outputs the speech of the plurality of group calls to the caller. However, the terminal apparatus 12 operates so as to selectively transmit the speech information for the caller to the terminal apparatuses 12 of the called parties in the main group among the plurality of groups, but not to the terminal apparatuses 12 of the called parties in other secondary groups. For example, in the example in FIG. 7A, when a caller makes a group call with the group including the called parties 41 and 42 as the primary group and the group including the called parties 43 and 44 as a secondary group, the controller 113 transmits speech information for the caller to the respective terminal apparatuses 12 of the called parties 41 and 42 and receives the speech information for the called parties 41 and 42 from the respective terminal apparatuses 12. On the other hand, the controller 113 does not transmit the speech information for the caller to the respective terminal apparatuses 12 of the called parties 43 and 44 but does receive the speech information for the called parties 43 and 44 from the respective terminal apparatuses 12. With this configuration, the caller can follow the content of calls in a plurality of groups while avoiding confusion in the conversations. In the group call for the secondary group, the controller 113 may display text corresponding to the speech instead of outputting the speech of the called parties.

The controller 113 also displays the avatar 40a in a different form than the caller 40, as illustrated in FIG. 7A. With this configuration, the caller can easily distinguish between the main and secondary groups in cases such as when the group joined by the caller 40 is the main group and the group joined by the avatar 40a is a secondary group. Furthermore, the controller 113 may display the called parties 41 and 42 in the main group in a different form than the called parties 43 and 44 in the secondary group, for example by effects such as light emission or shading, or by thickening the outlines.

The controller 113 can change the main group as needed in response to an operation by the caller. Such an operation is, for example, a tap, gesture, or the like to select a change in the main/secondary status of a group from a pop-up menu.

Figure 7B:
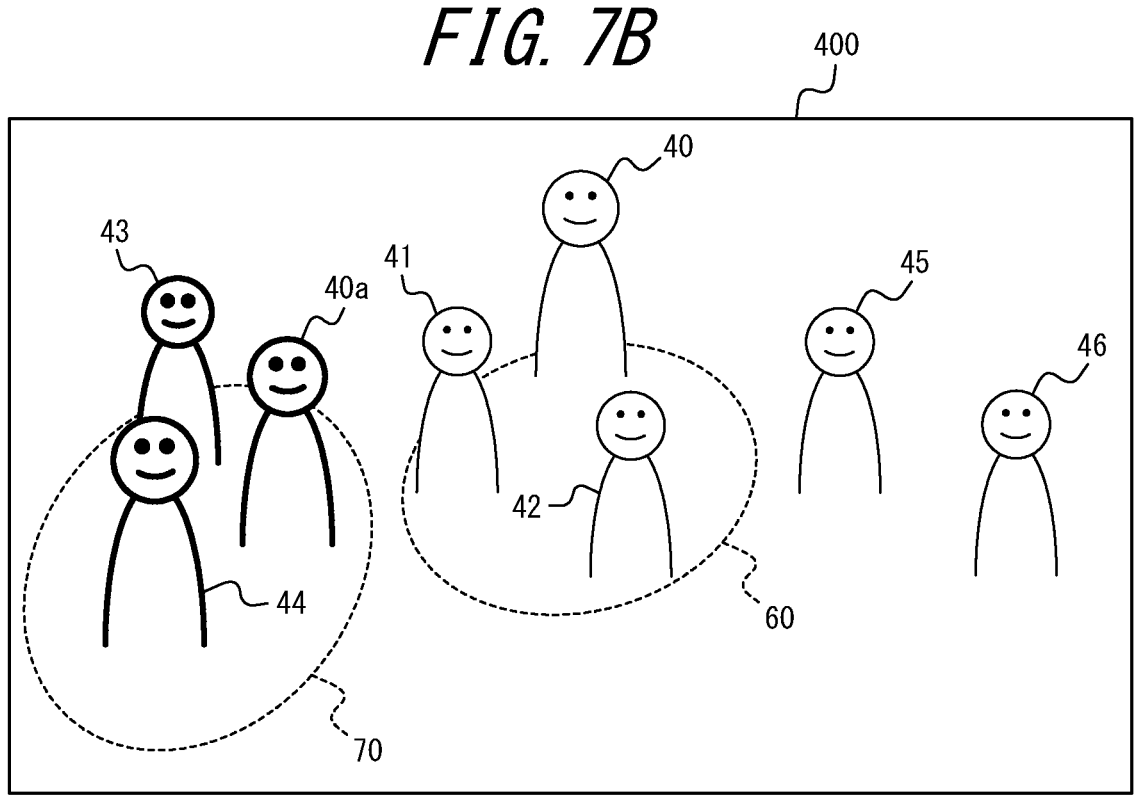
FIG. 7B is a diagram illustrating an example of a virtual space image.

FIG. 7B is an example of a virtual space image 400 displayed on the terminal apparatus 12 of the called party 44 in FIG. 7A. Here, the avatar 40a of the caller 40 and the called party 44 are displayed in the group of the called party 44. The group including the caller 40 and the called parties 41 and 42, from the caller 40's perspective, is also displayed. With this configuration, the presence of the avatar 40a can be recognized by the called party 44 as well, thereby reducing a feeling of discomfort during the group call.

As described above, the caller and the called party are represented by 3D models based on captured images but may instead be represented by images of avatars, characters, or the like that are generated without reference to captured images. In such a case, the terminal apparatus 12 transmits information on an image for configuring an avatar, character, or the like to the other terminal apparatuses 12 instead of transmitting the captured image, distance image, and the like. With this configuration, images of the caller and the called parties can be displayed on each terminal apparatus 12.

According to the above embodiment, the caller can hold a group call after joining a plurality of groups, which improves convenience for users who make calls in the virtual space.

While embodiments have been described with reference to the drawings and examples, it should be noted that various modifications and revisions may be implemented by those skilled in the art based on the present disclosure. Accordingly, such modifications and revisions are included within the scope of the present disclosure. For example, functions or the like included in each means, each step, or the like can be rearranged without logical inconsistency, and a plurality of means, steps, or the like can be combined into one or divided.

The invention claimed is:

1. A terminal apparatus comprising:
a communication interface;
an output interface; and
a controller configured to communicate with terminal apparatuses of a plurality of called parties via the communication interface and output, via the output interface, an image of a virtual space, the image including images of the plurality of called parties, and speech of the plurality of called parties, wherein
the controller outputs images or speech of called parties in a plurality of groups to which a caller belongs in a different form than other called parties outside of the plurality of groups to which the caller belongs and outputs information, to terminal apparatuses of the called parties in the plurality of groups, for outputting an image or speech of the caller in a different form than terminal apparatuses of the other called parties,
the plurality of groups includes a primary group and a secondary group,
the controller transmits speech of the caller to the terminal apparatuses of the called parties in the primary group and receives speech of the called parties in the primary group from the terminal apparatuses of the called parties in the primary group, and
the controller does not transmit speech of the caller to the terminal apparatuses of the called parties in the secondary group, and does receive speech of the called parties in the secondary group from the terminal apparatuses of the called parties in the secondary group.

2. The terminal apparatus according to claim 1, wherein the controller selects the plurality of groups from among the plurality of called parties in response to an operation by the caller.

3. The terminal apparatus according to claim 1, wherein the controller outputs text corresponding to the speech of the called parties in the secondary group.

4. A non-transitory computer readable medium storing a program to be executed by a controller of a terminal apparatus comprising a communication interface, an output interface, and the controller, the program being configured to cause the controller to:
communicate with terminal apparatuses of a plurality of called parties via the communication interface and output, via the output interface, an image of a virtual space, the image including images of the plurality of called parties, and speech of the plurality of called parties, wherein
the program is further configured to cause the controller to output images or speech of called parties in a plurality of groups to which a caller belongs in a different form than other called parties outside of the plurality of groups to which the caller belongs and output information, to terminal apparatuses of the called parties in the plurality of groups, for outputting an image or speech of the caller in a different form than terminal apparatuses of the other called parties,
the plurality of groups includes a primary group and a secondary group,
the program is further configured to cause the controller to transmit speech of the caller to the terminal apparatuses of the called parties in the primary group and receive speech of the called parties in the primary group from the terminal apparatuses of the called parties in the primary group, and
the program is further configured to cause the controller to not transmit speech of the caller to the terminal apparatuses of the called parties in the secondary group, and to receive speech of the called parties in the secondary group from the terminal apparatuses of the called parties in the secondary group.

5. The non-transitory computer readable medium according to claim 4, wherein the program is configured to cause the controller to select the plurality of groups from among the plurality of called parties in response to an operation by the caller.

6. The non-transitory computer readable medium according to claim 4, wherein the program is configured to cause the controller to output text corresponding to the speech of the called parties in the secondary group.

7. A method of operating a terminal apparatus comprising a communication interface, an output interface, and a controller, the method comprising:
communicating, by the controller, with terminal apparatuses of a plurality of called parties via the communication interface and outputting, via the output interface, an image of a virtual space, the image including images of the plurality of called parties, and speech of the plurality of called parties; and
outputting, by the controller, images or speech of called parties in a plurality of groups to which a caller belongs in a different form than other called parties outside of the plurality of groups to which the caller belongs and outputting information, to terminal apparatuses of the called parties in the plurality of groups, for outputting an image or speech of the caller in a different form than terminal apparatuses of the other called parties,
wherein the plurality of groups includes a primary group and a secondary group, and
wherein the method further comprises
transmitting speech of the caller to the terminal apparatuses of the called parties in the primary group and receiving speech of the called parties in the primary group from the terminal apparatuses of the called parties in the primary group, and
not transmitting speech of the caller to the terminal apparatuses of the called parties in the secondary group, and receiving speech of the called parties in the secondary group from the terminal apparatuses of the called parties in the secondary group.

8. The method according to claim 7, wherein the controller selects the plurality of groups from among the plurality of called parties in response to an operation by the caller.

9. The method according to claim 7, wherein the controller outputs text corresponding to the speech of the called parties in the secondary group.

* * * * *